United States Patent [19]

Shigematsu et al.

[11] Patent Number: 5,432,715
[45] Date of Patent: Jul. 11, 1995

[54] COMPUTER SYSTEM AND MONITORING METHOD

[75] Inventors: Mari Shigematsu; Teruyasu Nakahashi, both of Hitachi; Hideki Sato, Katsuta; Keiichi Sannomiya, Hitachi; Kouji Kobayashi, Hitachiota; Kazuma Nakao, Ibaraki; Hajime Fujimoto, Hitachiota; Yasushi Kobayashi, Hitachi, all of Japan

[73] Assignees: Hitachi, Ltd., Tokyo; Hitachi Process Computer Engineering, Inc., Hitachi, both of Japan

[21] Appl. No.: 85,386

[22] Filed: Jun. 29, 1993

[30] Foreign Application Priority Data

Jun. 29, 1992 [JP] Japan ................................. 4-170446

[51] Int. Cl.6 ............................................. G01B 21/00
[52] U.S. Cl. .............................. 364/551.01; 364/132; 364/133; 364/138; 371/16.1; 395/575
[58] Field of Search ................ 364/138, 132, 133, 134, 364/551.01; 371/16.5, 16.1; 395/575, 13, 650, 157; 340/825.07, 825.08

[56] References Cited

U.S. PATENT DOCUMENTS

| | | | |
|---|---|---|---|
| 3,701,971 | 10/1972 | Sanner et al. | 345/525 |
| 4,697,242 | 9/1987 | Holland et al. | 395/13 |
| 4,718,002 | 1/1988 | Carr | 364/200 |
| 4,890,257 | 12/1989 | Anthias et al. | 364/900 |
| 4,962,532 | 10/1990 | Kosiraj et al. | 395/650 |
| 4,992,950 | 2/1991 | Francisco | 364/132 |
| 5,062,046 | 10/1991 | Sumiyoshi et al. | 364/133 |
| 5,072,370 | 12/1991 | Durdik | 395/575 |
| 5,142,683 | 8/1992 | Burkhardt, Jr. et al. | 395/228.8 |
| 5,163,052 | 11/1992 | Evans et al. | 371/16.1 |
| 5,166,675 | 11/1992 | Amemiya et al. | 340/825.08 |
| 5,230,041 | 7/1993 | Dinwiddie, Jr. et al. | 395/157 |
| 5,237,677 | 8/1993 | Hirosawa et al. | 371/16.5 |
| 5,297,251 | 3/1994 | Alcorn et al. | 395/157 |
| 5,297,252 | 3/1994 | Becker | 364/138 |

FOREIGN PATENT DOCUMENTS

| | | |
|---|---|---|
| 4039013A1 | 6/1991 | Germany . |
| 63-87838 | 4/1988 | Japan . |
| 2212947 | 8/1990 | Japan . |
| 2270043 | 11/1990 | Japan . |
| 3142540 | 6/1991 | Japan . |
| 3144834 | 6/1991 | Japan . |
| 3257639 | 11/1991 | Japan . |

OTHER PUBLICATIONS

U.S. Patent Application Ser. No. 07/616,867 (which corresponds to DE 4039013A1).

*Primary Examiner*—Emanuel T. Voeltz
*Assistant Examiner*—Hal D. Wachsman
*Attorney, Agent, or Firm*—Kenyon & Kenyon

[57] ABSTRACT

A computer system and monitoring method for efficiently monitoring a plurality of computers interconnected within a network. In this computer network system, each computer has a self-monitoring unit for monitoring its own computer and acquiring a monitor message, and a transmitting unit for transmitting the monitor message to a monitoring computer. Monitor messages transmitted from a plurality of computers are received by the monitoring computer. The monitoring computer has a receiving unit for receiving monitor messages, and a displaying unit for outputting monitor messages to a display. The receiving unit, displaying unit, and display windows on the display are provided for each of a plurality of computers to be monitored.

16 Claims, 12 Drawing Sheets

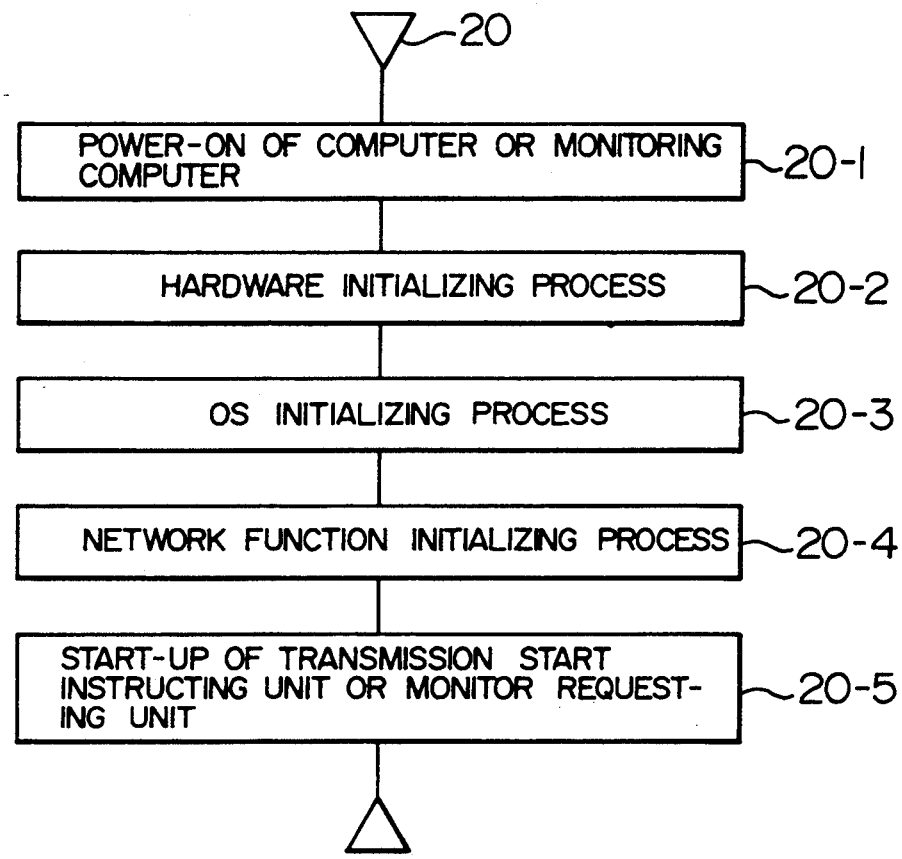
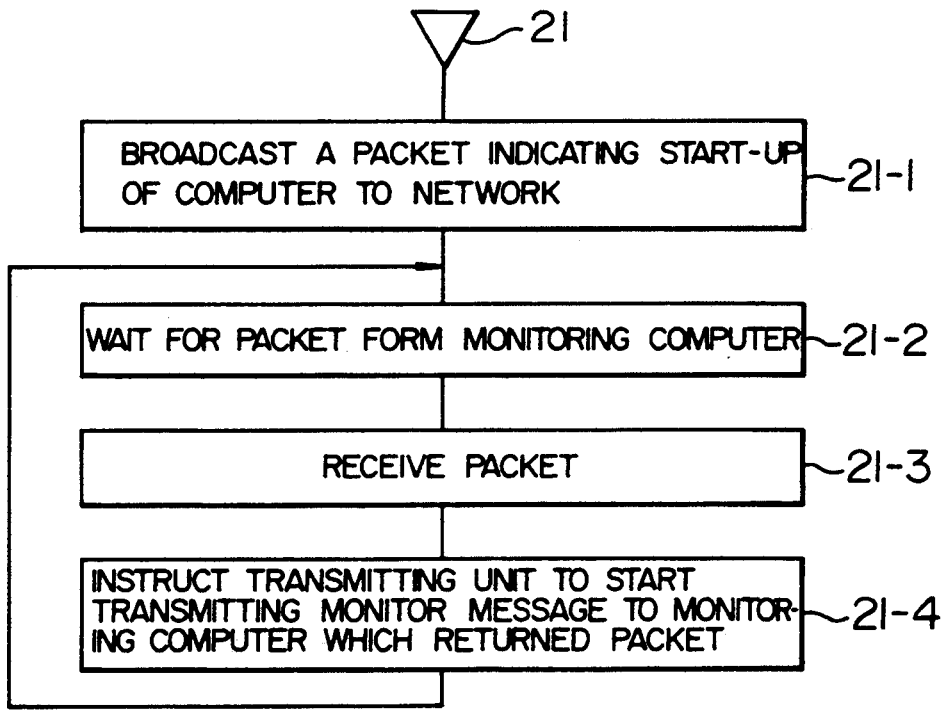

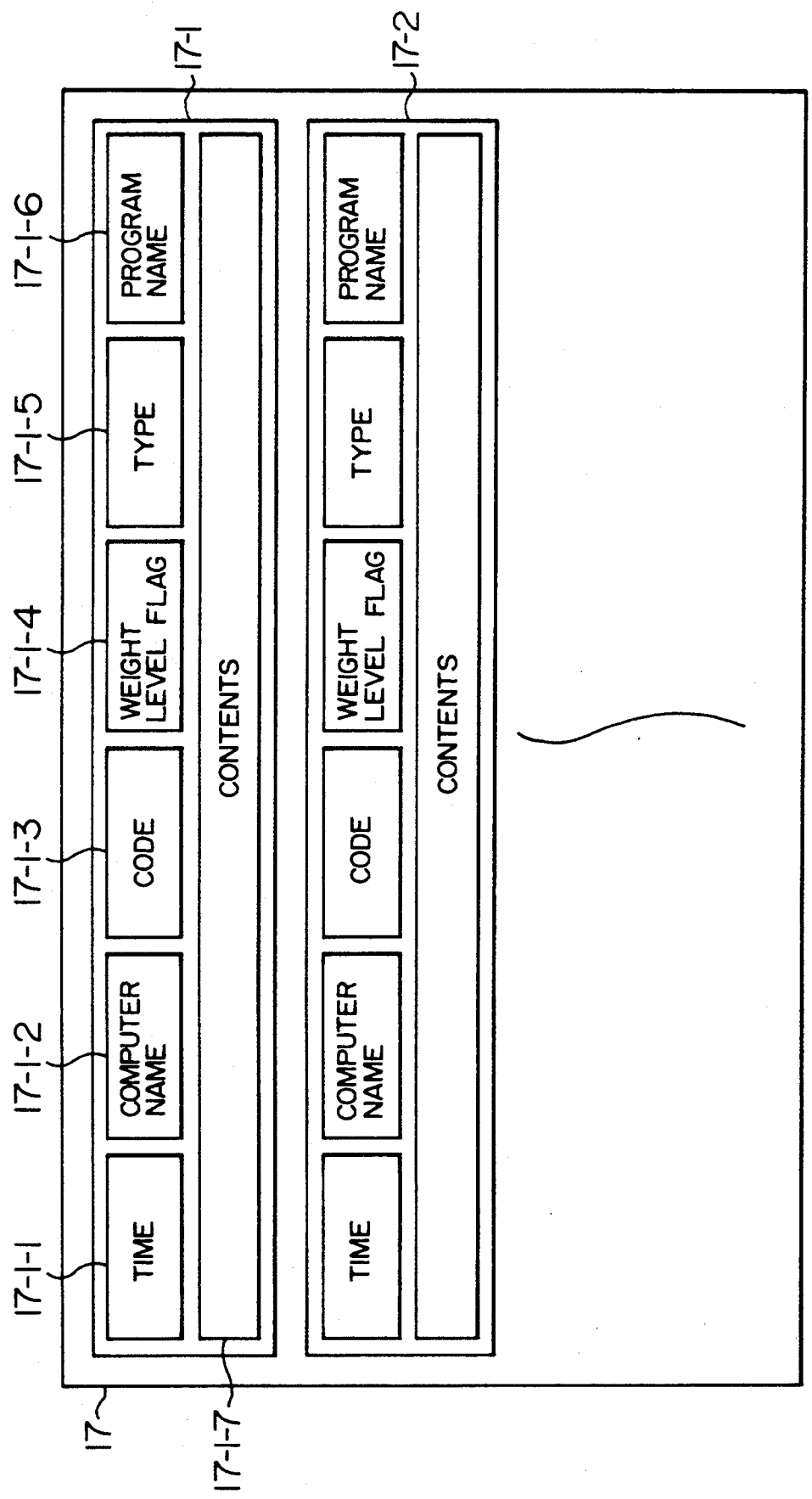

COMPUTER SYSTEM AND MONITORING METHOD

BACKGROUND OF THE INVENTION

1. Field of the Invention

The present invention relates to a computer system and a method of monitoring the system, and more particularly to a computer system and a monitoring method suitable for a system having a plurality of computers on a network.

2. Description of the Related Art

It is very important for the management of a computer system to monitor each computer within the system. An effective monitoring method such as a centralized monitoring method is known as described in JP-A-3-144834 and JP-A-3-257639. A message display format for such a centralized monitoring method is also known as described in JP-3-257639 and JP-A-2-212947.

In the above-described monitoring method, only one receiving unit is used for receiving monitor messages transmitted from a plurality of monitored computers. A monitor message from one computer often continues occupying the operation of the receiving unit, resulting in a reception delay or discard of monitor messages from other monitored computers.

With the conventional monitoring method wherein one receiving unit (monitoring computer) is used for receiving monitor messages transmitted from a plurality of transmitting units (monitored computers), a message reception delay or discard may occur so that it is not possible to provide real time monitoring or it becomes necessary to limit the length of each monitor message.

The main feature of a distributed network system is its expansibility, i.e., when the system is required to provide more services or each computer becomes overloaded, loads of the system can be easily distributed to additional computers. To retain such a feature, it is necessary to make the monitoring function flexibly cover an expanded area of the network and flexibly absorb an increase in the number of computers. With the conventional monitoring method, however, it is necessary for each monitored computer to store an address of the monitoring computer. Therefore, the monitor area and a monitored computer registration table are required to be checked again each time the system configuration is changed.

Another issue associated with this conventional monitoring method is system reliability. As a means for improving the reliability of monitoring, the method as used with a multi-computer system has been adopted conventionally. However, this method greatly depends on the master-slave relationship of the system, posing a problem of a difficulty in adding and changing elements constituting the system.

SUMMARY OF THE INVENTION

The present invention relates to a computer system, a method of monitoring the system, and a monitoring computer, capable of monitoring computers without limiting the length of a monitor message. According to the present invention, efficient monitoring can be realized by classifying monitor messages in accordance with the weight level of each message, and by providing a unique displaying method, e.g., displaying messages so that important messages are distinguished from other messages, while reliably tracking important messages even from a great number of monitor messages.

The present invention also relates to a monitoring start method in which the start-up of a monitoring computer and computers to be monitored is conducted in unique ways.

According to a first embodiment of the present invention, a computer system, a method of monitoring the system, and a monitoring computer are capable of flexibly dealing with a change in computer system configuration, while allowing the system to start monitoring without storing other addresses of monitoring computers and computers to be monitored.

According to one aspect of the present invention, a computer system, a method of monitoring the system, and a monitoring computer are capable of monitoring the system in real time without limiting the length of each monitor message, by providing the monitoring computer with means for receiving monitor information or gathering console messages representing the monitored results of each computer, the receiving means being provided for each computer. In the computer network system, each computer includes monitoring means for monitoring that computer, and acquiring monitor information or detecting console messages, and transmitting means for transmitting the monitor information to the monitoring computer. The monitor information transmitted from a plurality of computers is received at the monitoring computer which includes receiving means for receiving the transmitted monitor information and displaying means for displaying monitor information on a display. Other embodiments of the present invention include the following:

According to a first embodiment of the present invention, a monitor message receiving means, displaying means, or display window respectively of the monitoring computer is provided for each computer to be monitored. Accordingly, a message reception delay will not occur even if a number of monitor massages are received at the same time from a plurality of computers.

According to a second embodiment of the present invention, in addition to the features of the first embodiment, each computer is provided with important message transmitting means, and the monitoring computer is provided with important message receiving means and its display window. Important messages indicating a possibility of a system-down event such as an operating system failure or an error and hardware troubles or errors are selected from all monitor messages transmitted from all computers to be monitored, and are displayed on the single display window. Important messages displayed on the single display window provide a more efficient monitoring than when they are displayed separately for each computer to be monitored.

According to a third embodiment of the present invention, each computer is provided with transmission start instructing means, and the monitoring computer is provided with monitor requesting means. With data transfer therebetween, it is possible to instruct the transmitting means and receiving means to start transmitting and receiving monitor messages. As a result, monitoring can be started irrespective of the start-up order of the monitoring computer and computers to be monitored.

According to a fourth embodiment of the present invention, a monitoring computer is used capable of being mounted on-line and dismounted without affecting the operation of the system.

According to a fifth embodiment of the present invention, monitor message transmitting means of the computer is provided for each of a plurality of monitoring computers, to allow monitor messages to be transmitted to a plurality of monitoring computers.

According to a sixth embodiment of the present invention, the monitoring computer is provided with an individual computer registration table for storing the information of computers to be monitored and means for updating the contents of the table. It is therefore possible to monitor the divisional monitor areas by a plurality of monitoring computers.

According to a seventh embodiment of the present invention, the monitoring computer is provided with self-monitoring means and monitor message transmitting means. It is therefore possible to mutually monitor a plurality of monitoring computers interconnected within the network. For example, when one monitoring computer detects trouble or an error at another monitoring computer through mutual monitoring, the one monitoring computer backs up the monitor area of the other monitoring computer by updating the individual computer registration table.

According to a eighth embodiment of the present invention, a computer with a monitoring function is provided with a monitoring function keep-alive management table to turn on and off the function when necessary. When the function is turned off, it can be used as a general computer to be monitored. This computer with the monitoring function can be efficiently used in the system, for example, by turning off the function in a normal state and by turning on the function only when a monitoring computer is in trouble or error.

As described above, the present invention realizes a high efficiency and reliability, and flexible monitoring for a so-called distributed system in which a plurality of computers operate independently. The present invention is particularly effective where the network has a broad monitor area and a number of computers to be monitored, and where the monitor area and the number of computers change year after year.

BRIEF DESCRIPTION OF THE DRAWINGS

FIG. 2 is a flow chart explaining the start-up sequence of the computer system of the first embodiment of the present invention.

FIG. 3 is a flow chart explaining the monitoring start sequence of each computer to be monitored of the first embodiment of the present invention.

FIG. 9 is a diagram showing an example of the format of data to be displayed on an important message display window.

DETAILED DESCRIPTION

Embodiments of the present invention will now be described in detail. In order to enable an easier understanding of the present invention, the description will be given by dividing it into the following Sections.

1. Summary of Monitoring Method
2. Monitoring Start Sequence
3. Acquisition of Monitor Message
4. Transmission of Monitor Message
5. Display Format of Monitor Message
6. Monitoring Method Using A Plurality of Monitoring Computers
7. Computer with Monitoring Function
8. Replacement and Addition of Monitoring Computer 1. Summary of Monitoring Method FIG. 1 shows the structure of a computer system according to an embodiment of the present invention.

Figure 1:
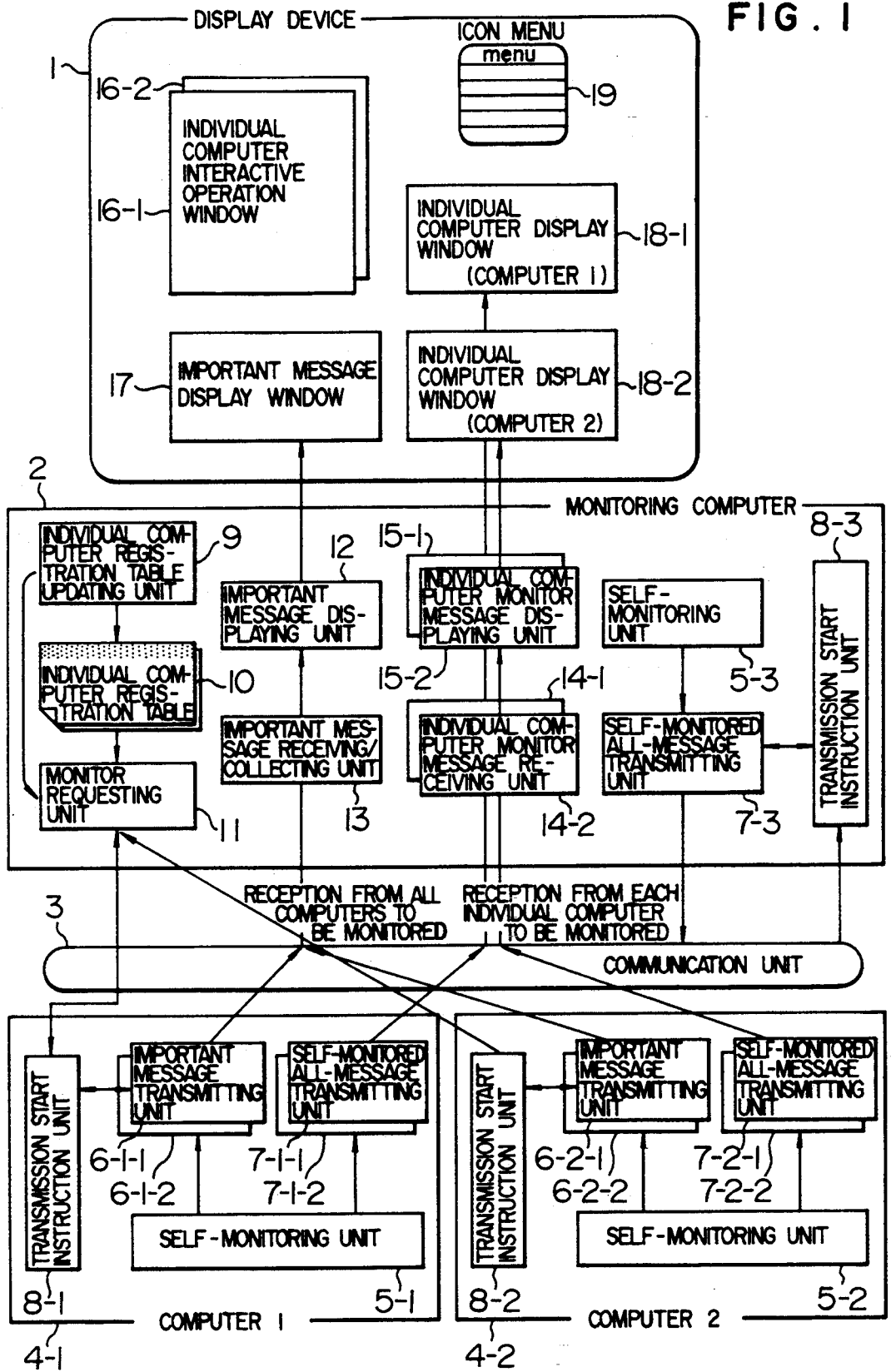
FIG. 1 is a block diagram showing the outline of a computer system according to an embodiment of the present invention.

The computer system shown in FIG. 1 includes a plurality of computers 4-1 and 4-2, which execute on-line services and are to be monitored, a monitoring computer 2 for monitoring computers 4-1 and 4-2, a communication unit (communication means) 3 such as an FDDI (Frame Distribute Data Interface), and a display device 1 such as a CRT display device for displaying monitored messages collected by the monitoring computer 2.

The computers to be monitored 4-1 and 4-2 have the same structure. In the following description, the computer 4-1 will be described by way of example. Although a plurality of self-monitored important message transmitting units (self-monitored important message transmitting means) and self-monitored all-message transmitting units (self-monitored all-message transmitting means) are shown in FIG. 1, these will be collectively described later with respect to Section 6. (Monitoring Method Using A Plurality of Monitoring Computers). In the description of Section 1, it is assumed for simplicity that each computer has one important message transmitting unit and one self-monitored all-message transmitting unit. However, each computer could include a plurality of important message transmitting units 6-1-1, 6-1-2, etc. and a plurality of self-monitored all-message transmitting units 7-1-1, 7-1-2, etc. In the following description, the important message transmitting unit 6-1-1 and self-monitored all-message transmitting unit 7-1-1 will be described by way of example.

The computer 4-1 has a general information processing function as well as other functions. These other functions are realized by a self-monitoring unit (self-monitoring means) 5-1, the important message transmitting unit 6-1-1, and self-monitored all-message transmitting unit 7-1-1. The self-monitoring unit 5-1 monitors its own computer 4-1 and transfers monitored messages to the transmitting units. The important message transmitting unit 6-1-1 transmits only important messages among self-monitored messages. The self-monitored all-message transmitting unit 7-1-1 transmits all self-monitored messages including important messages. "Self-monitored messages" include a processor status message, error message, job status message, respectively of the computer, and a system status message such as a network status message. "Important self-monitored messages" include an OS (operating system) trouble or error message and a hardware trouble or error message. These troubles or errors may cause a failure of the entire computer system or of a portion thereof. The self-monitoring unit 5-1 judges whether or not a monitored message is important. If the self-monitoring unit 5-1 determines that a message is important, this message is transferred to both the important message transmitting unit and the self-monitored message transmitting unit. If the self-monitored message unit 5-1 determines that a message is not important, it is transferred only to the self-monitored all-message transmitting unit. Each transmitting unit transmits a message which is transferred from the self-monitoring unit 5-1 to the monitoring computer 2. The message transmitting method will be described later in connection with Section 4.

The monitoring computer 2 includes an important message receiving/collecting unit (important message receiving/collecting means) 13, individual computer monitor message receiving units (individual computer monitor message receiving means) 14-1 and 14-2, an important message displaying unit (important message displaying means) 12, and individual computer monitor message displaying units (individual computer monitor message displaying means) 15-1 and 15-2. The important message receiving/collecting unit 13 receives important messages transmitted from the important message transmitting units 6-1-1 and 6-2-1. The individual computer monitor message receiving units 14-1 and 14-2 receive monitor messages transmitted from the self-monitored all-message transmitting units 7-1-1 and 7-2-1. The important message display unit 12 outputs the monitor messages collected by the important message receiving/ collecting unit to the display device 1 to display the messages. The individual computer monitor message displaying units 15-1 and 15-2 output the monitor messages received by the individual computer monitor messages receiving units to the display device 1 to display the messages. Monitor messages transmitted from the important message transmitting units 6-1-1 and 6-2-1 of the computers 4-1 and 4-2 are both received by the important message receiving/collecting unit 13 of the monitoring computer 2, and the important message displaying unit 12 outputs the received important messages to the display device 1 and displays the messages on an important message display window 17. Monitor messages transmitted from the self-monitored all-message transmitting unit 7-1-1 of the computer 4-1 are received by the individual computer monitor message receiving unit 14-1 of the monitoring computer 2, and the individual computer message displaying unit 15-1 displays the received monitor messages on an individual computer monitor message display window 18-1 for the computer 4-1. Monitor messages transmitted from the self-monitored all-message transmitting unit 7-2-1 of the computer 4-2 are received by the individual computer monitor message receiving unit 14-2 of the monitoring computer 2, and the individual computer monitor message displaying unit 15-2 displays the received monitor messages on an individual computer message display window 18-2 for the computer 4-2. The individual computer monitor message receiving units, individual computer monitor message displaying units, and individual computer message display windows are provided as many number as that of computers to be monitored. Since each computer is provided with its own monitor message receiving unit, displaying unit, and window, it is possible to eliminate the message reception delay or discard. If the monitoring computer had only one set of the monitor message receiving unit, displaying unit and window, these units and window are occupied in some cases by one computer sending a great amount of messages.

In addition to the individual computer monitor message display windows and important message display window, the display device 1 has individual computer interactive operation display windows 16-1 and 16-2. If an operator who monitors the computers judges that it is necessary to act upon any computer, the operator can access the computer from the corresponding individual computer interactive operation window. The display device 1 has also a menu 19 (an icon menu shown in FIG. 1 may be used) for opening/closing the windows.

In the computer system constructed and operating as above, it is possible to efficiently monitor a plurality of computers by a single monitoring computer.

2. Monitoring Start Sequence

The monitoring start sequence will be described next. The present invention includes an embodiment in which monitoring starts independently from the start-up order of the monitoring computer and computers to be monitored. Specifically, if the computer to be monitored has already started up, the monitoring computer starts monitoring when it is started up, whereas if the monitoring computer has started first, it starts monitoring when the computer to be monitored is started up. Similarly, if some of a plurality of computers to be monitored have started before the start-up of the monitoring computer and others have started after the start-of the monitoring computer, the former computers are monitored when the monitoring computer is started up and the latter computers are monitored when they are started up. It is not necessary for an operator to manually instruct the monitoring start, because the computer system automatically starts monitoring in response to the start-up of the monitoring computer or computers to be monitored. It is obvious that the computer system may be configured to allow an operator to manually instruct the monitoring start. In the following description, however, the automatic monitoring start in response to the start-up of the monitoring system or computers to be monitored will be described.

The present invention also includes an embodiment in which monitoring can be executed without storing other addresses in the monitoring computers and computers to be monitored. This can be realized by a so-called broadcast wherein a packet is transmitted to all computers to be monitored (including the monitoring computer) interconnected by the network. Namely, one computer transmits its own address to all computers, and another computer responds to it by referring to the transmitted address. As a result, each computer is not required to store the address of another computer. The work load of storing the addresses of other computers becomes greater as the number of computers increases, and the work load of restoring changed addresses impose a large burden on the computer system. The embodiment is free from these disadvantages.

Referring to FIG. 1, the monitoring start method will be described by illustratively using the same computer 4-1 as used for the description of Section 1 [Summary of Monitoring Method]. The computer 4-1 has a transmission start instructing unit (transmission start indicating means) 8-1 which instructs the transmission start to the important message transmitting unit 6-1-1 and individual computer monitor message transmitting unit 7-1-1. The monitoring computer 2 has a monitor requesting unit (monitor requesting means) 11 which instructs the reception start to the important message receiving/collecting unit 13 and individual computer monitor message receiving units 14-1 and 14-2. Due to the communication between the transmission start instructing unit and monitor requesting unit, it is possible to realize the above-described monitoring independent from the start-up order.

Prior to giving the description of the transmission start instructing unit and monitor requesting unit, a method of starting up these units will be described. In the present invention, functions specific to the network are assumed to be available to the embodiment system. It is necessary to make such functions active before starting up the transmission start unit and monitor requesting unit for the start-up of the monitoring computer and computers to be monitored.

FIG. 2 is a flow chart explaining the start-up procedure for the monitoring computer and computers to be monitored according to an embodiment of the present invention. The same procedure is applied to both the monitoring computer and computers to be monitored. When the system power is turned on (Step 20-1), an initializing process for hardware and OS is executed (Steps 20-2 and 20-3). An initializing process for specific functions of the network is executed (Step 20-4). After this Step 20-4, the start-up of the transmission start instructing unit and monitor requesting unit is effected (Step 20-5).

Referring to FIG. 3, the procedure 21 for the transmission start instructing unit 8-1 will be described in detail. This procedure starts synchronously with the start-up of the computer to be monitored, as described above. The transmission start instructing unit of the computer broadcasts a packet informing the start-up over the network (Step 21-1). Thereafter, the transmission start instructing unit waits for a packet returned from the monitoring computer (Step 21-2). If the monitoring computer has already started up, the monitoring computer responds to the broadcast packet and sends back a packet. On the other hand if the monitoring computer has not yet been started, the transmission start instructing unit stands by. In this case, a broadcast packet is sent back when the monitoring computer is started up. In either case, when a packet from the monitoring computer is received (Step 21-3), the transmission start instructing unit 8-1 instructs its important message transmitting unit and individual computer monitor message transmitting units to start transmitting monitor messages to the monitoring computer (Step 21-4). Thereafter, control returns to Step 21-2 to repeat the above operation for the case where there are a plurality of monitoring computers (this case will be later described in Section 6 (Monitoring Method Using A Plurality of Monitoring Computers).

Figure 4:
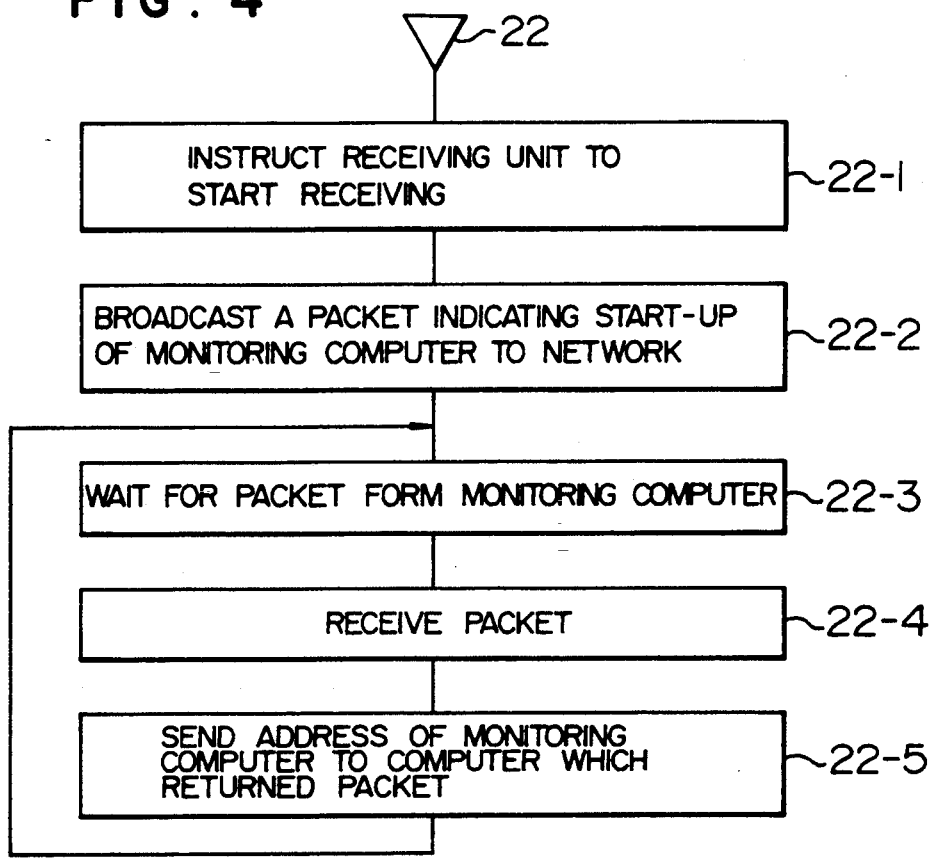
FIG. 4 is a flow chart explaining the monitoring start sequence of the monitoring computer of the first embodiment of the present invention.

Referring to FIG. 4, the procedure 22 for the monitor requesting unit 11 will be described in detail. This procedure starts synchronously with the start-up of the monitoring, as described above. The monitor requesting unit of the monitoring computer issues a reception start instruction to its important message receiving/collecting unit and individual computer monitor message receiving unit (Step 22-1). At this stage, since the computer to be monitored has not yet transmitted monitor messages, the receiving/collecting unit and receiving units are only in the start-up state and do not operate to receive monitor messages. Such a control is performed in order to prevent the message reception discard by always starting up the receiving units prior to the start-up of the transmitting units. Next, a packet informing the start-up of the monitoring computer is broadcast over the network (Step 22-2). If any computer has already been started up, this computer receives the packet, recognizes the address of the monitoring computer, and transmits monitor messages. The receiving units at the monitoring computer have already been activated at Step 22-1. Irrespective of the presence/absence of reception of monitor messages transmitted from any computer to be monitored, for the time being thereafter the monitor requesting unit waits for a packet informing the start-up of any other computer to be monitored (Step 22-3). Such control is performed in order to receive a broadcast packet transmitted at the start-up of a computer to be monitored, which computer is started up after the start-up of the monitoring computer. When a packet is received (Step 22-4), the address of the monitoring computer is sent back as a response to the pocket (Step 22-5). Thereafter, the control returns to Step 22-3. The computer to be monitored starts transmitting monitor messages to the monitoring computer as explained with the flow chart shown in FIG. 3.

With the above-described procedures, it is possible to start monitoring, independently from the start-up order of the monitoring computer and computers to be monitored, and without storing addresses of other computers.

3. Acquisition of Monitor Message

Figure 5:
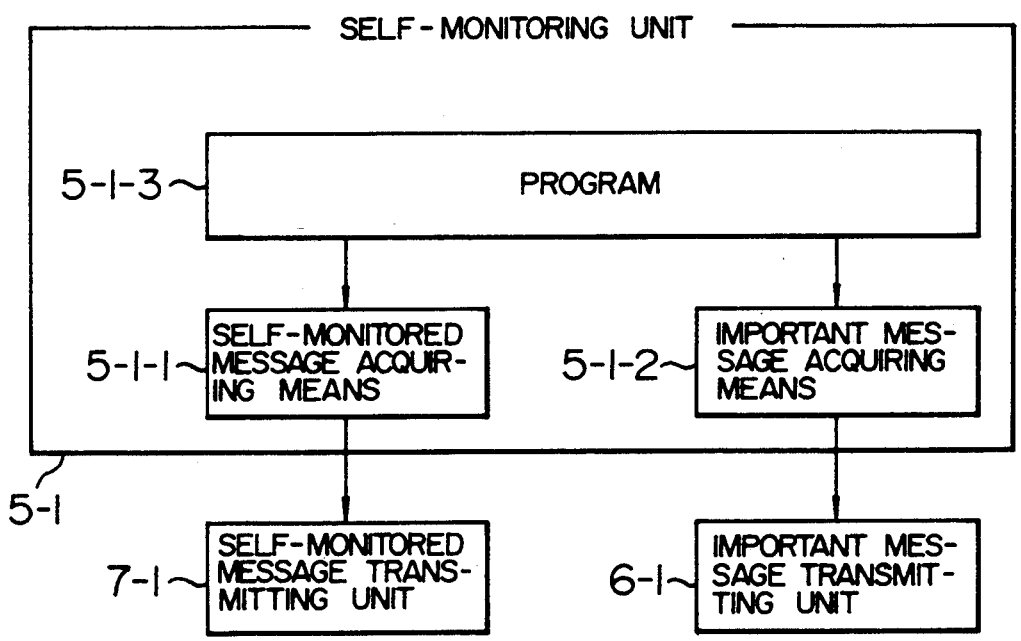
FIG. 5 is a schematic diagram showing the structure of the self-monitoring unit of the first embodiment of the present invention.

Referring to FIG. 5, the procedure, by the self-monitoring unit, of acquiring monitor messages and transferring them to the transmitting units will be described. The self-monitoring unit 5-1 includes programs 5-1-3, a self-monitored all-message acquiring means 5-1-1, and an important message acquiring means 5-1-2. The programs 5-1-3 include OS programs, user programs, and the like. With the self-monitored all-message acquiring means 5-1-1, all monitor messages acquired during the execution of the OS program are transferred to the self-monitored all-message transmitting unit 7-1. Similarly, with the important message acquiring means, acquired important messages are transferred to the important message transmitting unit 6-1. The two acquiring means are realized, for example, by function programs which are called by the OS program to transmit monitor messages to the monitoring computer. Specifically, for important messages, the two function programs representing the important message acquiring function and self-monitored all-message acquiring function are called, whereas for all messages, only the function program representing the self-monitored all-message acquiring function is called. By providing the monitor message acquiring means by two function programs, it is possible to readily transfer monitor messages distinguishably between important and all messages to the transmitting units, by running the program calling such function programs. In this embodiment, monitor messages are classified into important messages and self-monitored all messages. It is obvious that monitor messages may be transferred by classifying them basing on other criteria.

4. Transmission of Monitor Message

Next, the description will be given for the procedure of transmitting monitor messages acquired by a computer in the manner described in Section 3. (Acquisition of Monitor Message) and receiving the monitor messages at the receiving units of the monitoring computer.

Figure 6:
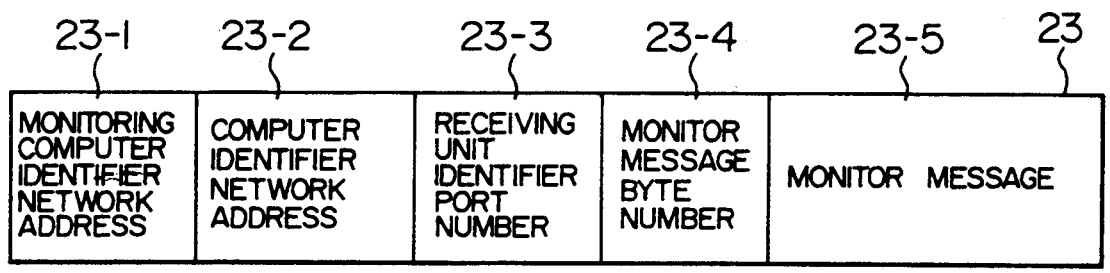
FIG. 6 is a diagram showing the format of monitor message data.

FIG. 6 shows the format of monitor message data. The monitor message data 23 contains a monitor message 23-5 as well as three data fields including a monitoring computer identifier 23-1, a computer identifier 23-2, and a receiving unit identifier 23-3. A number of monitor message bytes 23-4 as shown in FIG. 6 or other data may also be included in monitor message data 23. In this embodiment, TCP/IP is used as the communication protocol. In this case, the monitoring computer identifier 23-1 corresponds to a remote or destination network address, the computer identifier 23-2 corresponds to a local network address, and the receiving unit identifier 23-3 corresponds to a service port number. The format of monitor message data is the same for both important messages and all-messages.

Figure 7:
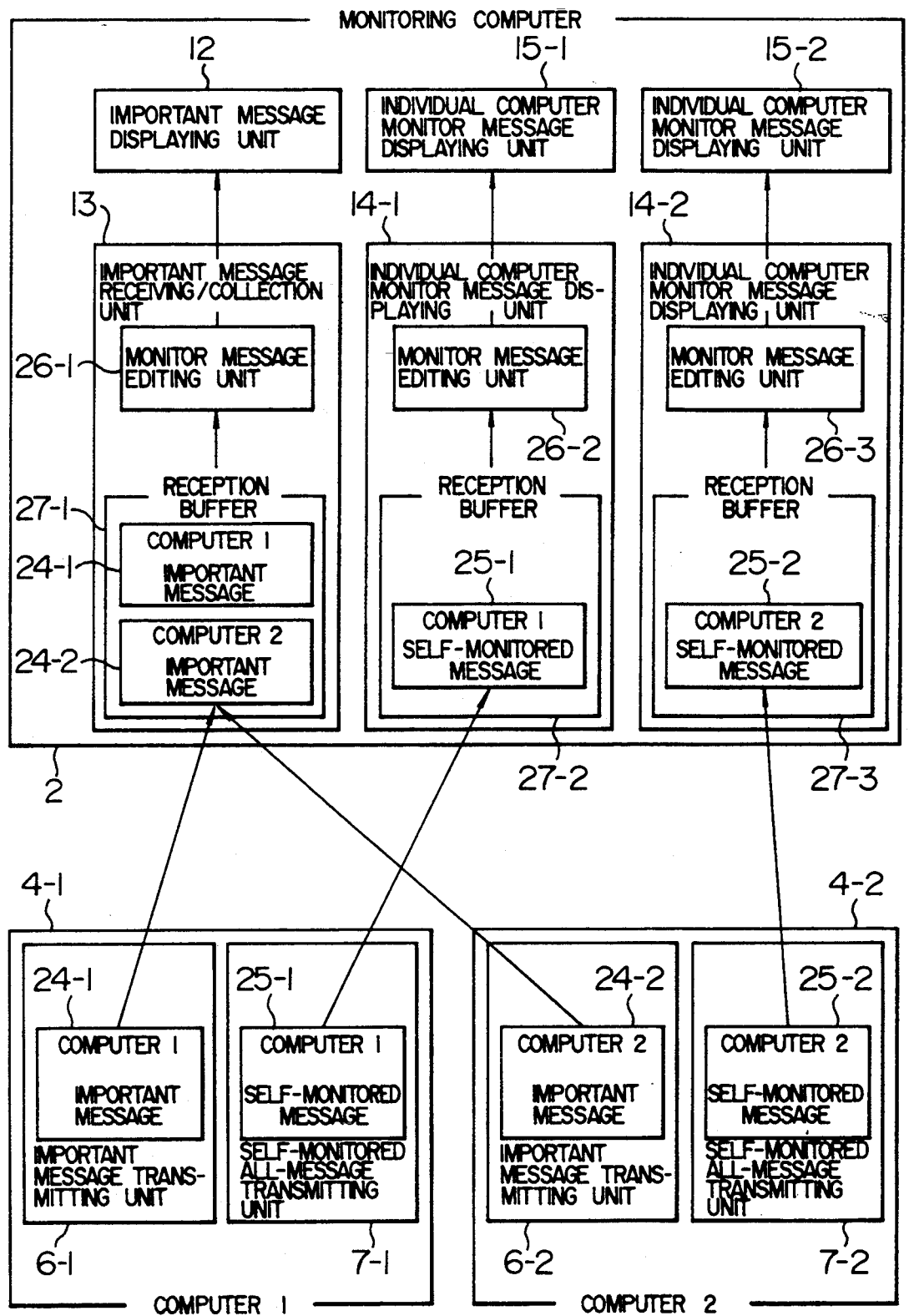
FIG. 7 is a block diagram explaining the outline of a monitor message communication method according to a second embodiment of the present invention.

Next, referring to FIG. 7, a monitor message packet communication method will be described. In the following description, the computer 4-1 is used by way of example similarly to the description given for Section 1. (Summary of Monitoring Method)

First, a method of transmitting/receiving important messages will be described. The important message transmitting unit of the computer 4-1 transmits the acquired important messages as important message data 24-1, by adding thereto the address of the monitoring computer 2 as the monitoring computer identifier, the port number of the important message receiving/collecting unit 13 of the monitoring computer 2 as the receiving unit identifier, and the address of the computer 4-1 itself as the computer identifier. The important message receiving/collecting unit 13 of the monitoring computer judges the data 24-1 as destined to it while referring to the monitoring computer identifier and receiving unit identifier contained in the important monitor message packet, and receives the data 24-1. The important message receiving/collecting unit 13 has a reception buffer 27-1 and a monitor information editing unit 26-1. The reception buffer 27-1 temporarily stores the received packet and thereafter the editing process is executed. There is therefore less possibility of discarding any monitor message even when the monitor messages are received from both the computers 4-1 and 4-2. The monitor message editing unit 26-1 picks up the important message packet from the reception buffer, and edits the monitor messages. Monitor message editing is an operation of processing, classifying, and selecting monitor messages. For example, monitor message editing may include a process in which a time stamp is given to each monitor message, and a process in which the pattern of each monitor message is compared with a designated pattern to transfer only those monitor messages having the same pattern (filtering process). Logging of monitor messages is also one of the editing operations. After editing, the monitor message editing unit transfers the edited monitor messages to the important message displaying unit 12.

Next, a method of transmitting/receiving self-monitored all messages will be described. The self-monitored message transmitting unit 7-1 of the computer 4-1 transmits the acquired all messages as self-monitored all-message data 25-1, by adding thereto the address of the monitoring computer 2 as the monitoring computer identifier and the port number of the individual computer monitor message receiving unit 14-1 of the monitoring computer 2 as the receiving unit identifier. The self-monitored all-message data 25-1 is received by the individual computer monitor message receiving unit 14-1 of the monitoring computer 2, and temporarily stored in a reception buffer 27-2. Thereafter, the data is edited by a monitor message editing unit 26-2 and transferred to the individual computer monitor message displaying unit 15-1.

The important message receiving/collecting unit 13 and individual computer monitor message receiving unit 14-1 inform of the reception of the monitor messages to the message originating computer 4-1 to improve the communication reliability.

Figure 8:
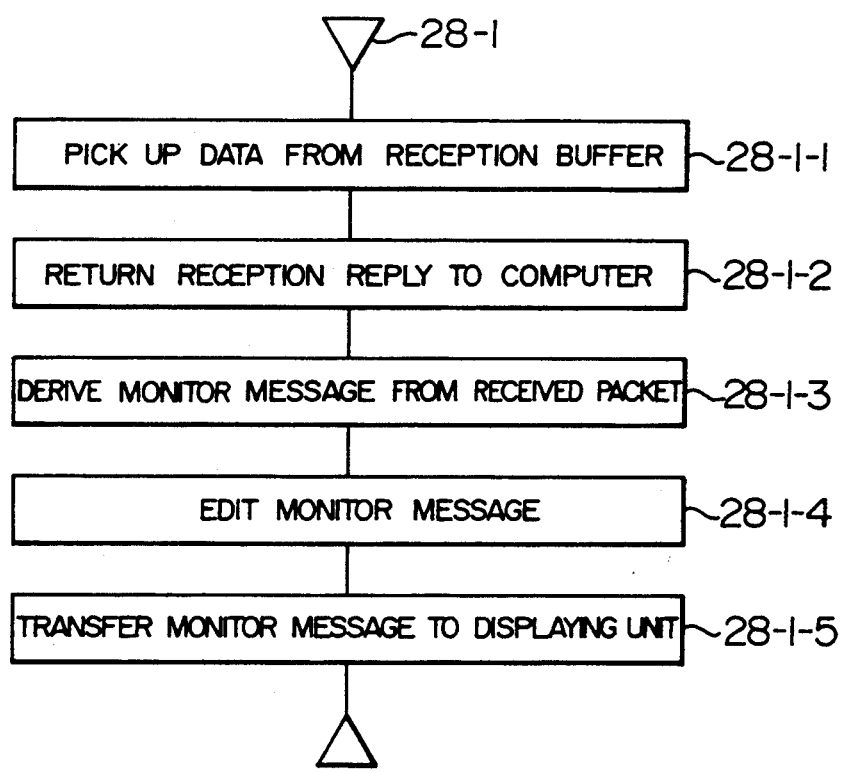
FIG. 8 is a flow chart explaining the monitor message receiving sequence of the second embodiment explained with FIG. 7.

FIG. 8 is a flow chart explaining the procedure common to the two receiving units 13 and 14-1. First, a packet is picked up from the reception buffer (Step 28-1-1), and thereafter a reception reply is sent back to the originating computer (Step 28-1-2). The Steps 28-1-1 and 28-1-2 may be executed in the order illustrated in FIG. 8 or in reverse order. In the embodiment illustrated in FIG. 8, the reception reply is executed following TCP/IP so that Step 28-1-2 is executed first. Then, additional information such as addresses are removed from the packet to leave only the monitor messages (Step 28-1-3). After the editing process (Step 28-1-4), the monitor messages are transferred to the displaying unit (Step 28-1-5).

5. Display Format of Monitor Message

Next, the display format of monitor messages will be described in detail. In this embodiment, a work station is used for a monitoring and displaying apparatus. Any display capable of displaying a plurality of windows may be used.

The outline of the display format will be described with reference to FIG. 1. The display 1 can display the important message display window 17 for displaying important messages, the individual computer monitor message display windows 18-1 and 18-2 for displaying all messages of each computer including important messages, the individual computer interactive display windows 16-1 and 16-2 for acting upon each computer by an operator, and the menu 19 for opening the above-described windows and closing them by changing them into icons. Each window will be described in detail.

<Important Monitor Message Display Window>

FIG. 9 shows the display format of the important monitor message display window 17 of this embodiment. In this embodiment, important monitor messages 17-1 and 17-2 are displayed in the format as shown. Of the following displayed items, the time item and computer name item are obtained by the monitor message editing unit of the important message receiving/collecting unit of each computer (refer to FIG. 7), and the other items are obtained directly from those acquired by the important message acquiring unit of the self-monitoring unit of the monitoring computer.

(1) Time 17-1-1

Time when the monitor message was received.

(2) Computer Name 17-1-2

Name of the computer from which the monitor message was transmitted. This name is used for identifying each of a plurality of computers whose monitor message is displayed within this window.

(3) Code 17-1-3

In this embodiment, a code is assigned to each important message. The code is used to indicate the type of the contents of the important message.

(4) Weight level flag 17-1-4

In this embodiment, important messages are further classified by a weight level or priority (e.g., relating to a part or the whole of the operation of the system). The flag is used for helping to identify the degree of the weight level at once.

(5) Type 17-1-5

The type is the monitor message type. For example, it indicates whether the monitor message is related to hardware or OS.

(6) Program name 17-1-6

The name of the program which called the important message acquiring means (refer to FIG. 5) to acquire the important message.

(7) Content 17-1-7

The content indicates the details of the monitor message.

The important message display window 17 displays monitor messages important to the system, and so it is required to be always opened when monitor messages are received. Even if an operator has changed this window into an icon, it automatically opens when monitor messages are received. This can be achieved by the important message displaying unit 12 which opens the window when the monitor messages transferred from the important message receiving/collecting unit are displayed. As an example of such cooperation between the receiving unit and displaying unit, a loud or bright color such as red may be used as the background color of the monitor message having the highest weight level.

<Individual Computer Monitor Message Display Window>

Figure 10:
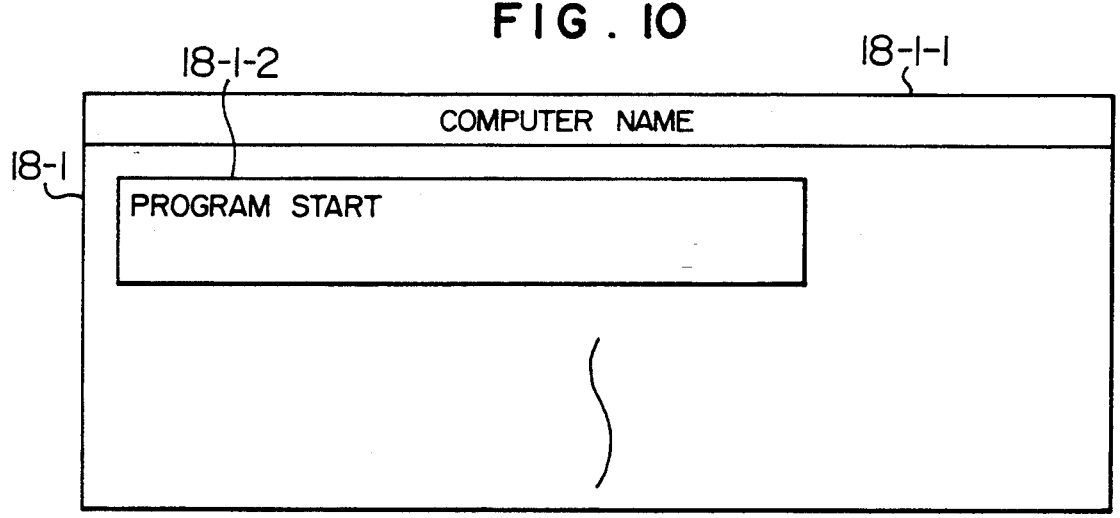
FIG. 10 is a diagram showing an example of the format of data to be displayed on an individual computer monitor message display window.

FIG. 10 shows the display format of the individual computer monitor message display window of this embodiment. This window is provided for each computer. The computer name is displayed as the title 18-1-1. In this embodiment, a particular format of a monitor message is not provided, but the monitor message 18-1-2 itself generated by each program of the computer is used.

Similar to the important message display window, the individual computer monitor message display window may be opened when monitor messages are received. However, if the number of windows becomes large and they are all displayed at the same time, the displayed windows give a bad view. In such a case, the window may be configured to be opened or changed into an icon manually by an instruction of an operator.

<Individual Computer Interactive Display Window>

Figure 11:
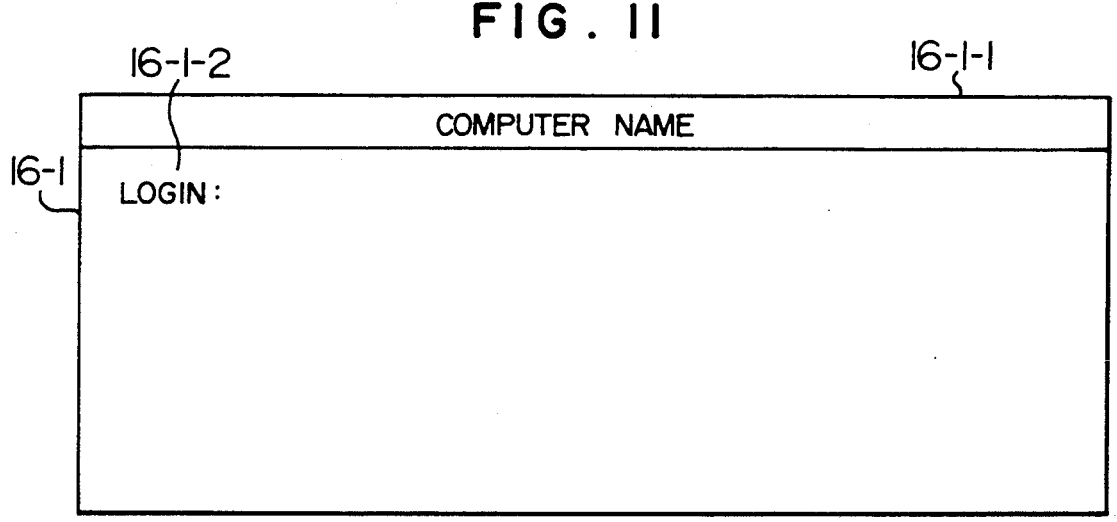
FIG. 11 is a diagram showing an example of the format of data to be displayed on an individual computer interactive operation window.

FIG. 11 shows the display format of the individual computer interactive display window. This window is provided for each computer, and the computer name 16-1-1 is displayed as its title. This window is acted upon by an operator from a keyboard, and a plurality of computers are not acted upon at the same time. From this viewpoint, it is sufficient even if one interactive display window is provided. In this embodiment, however, in order to lessen the operator burden of selecting and accessing a particular computer from one window, each computer is provided with its own interactive display window to allow a direct log-in of the computer. Also in this embodiment, a "telnet" command is used. If there is no problem in terms of security, the log-in operation is made easy by using a "rlogin" command.

<Menu>

Figure 12:
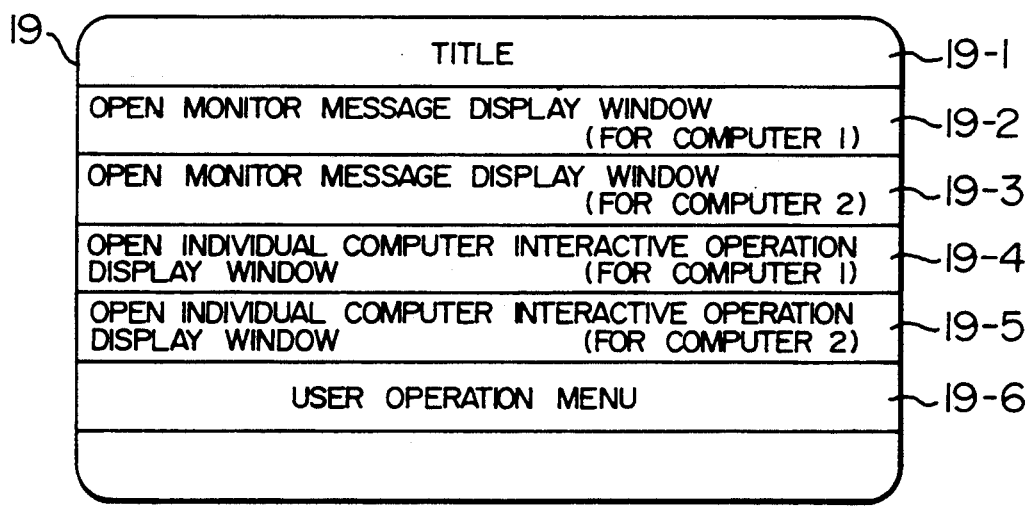
FIG. 12 is a diagram showing an example of a window operation menu.

FIG. 12 shows the contents of the menu which is used for the purpose of improving the operation efficiency of the various windows described above. The menu title 19-1 is displayed, and each window is opened as indicated by 19-2 to 19-5 (or changed into an icon). A process designated and set by a user may also be added in the menu.

6. Monitoring Method Using A Plurality of Monitoring Computers

Another embodiment of the present invention will be described in which a plurality of monitoring computers are installed in the computer system embodiments described with in Sections 1 to 5.

Figure 13:
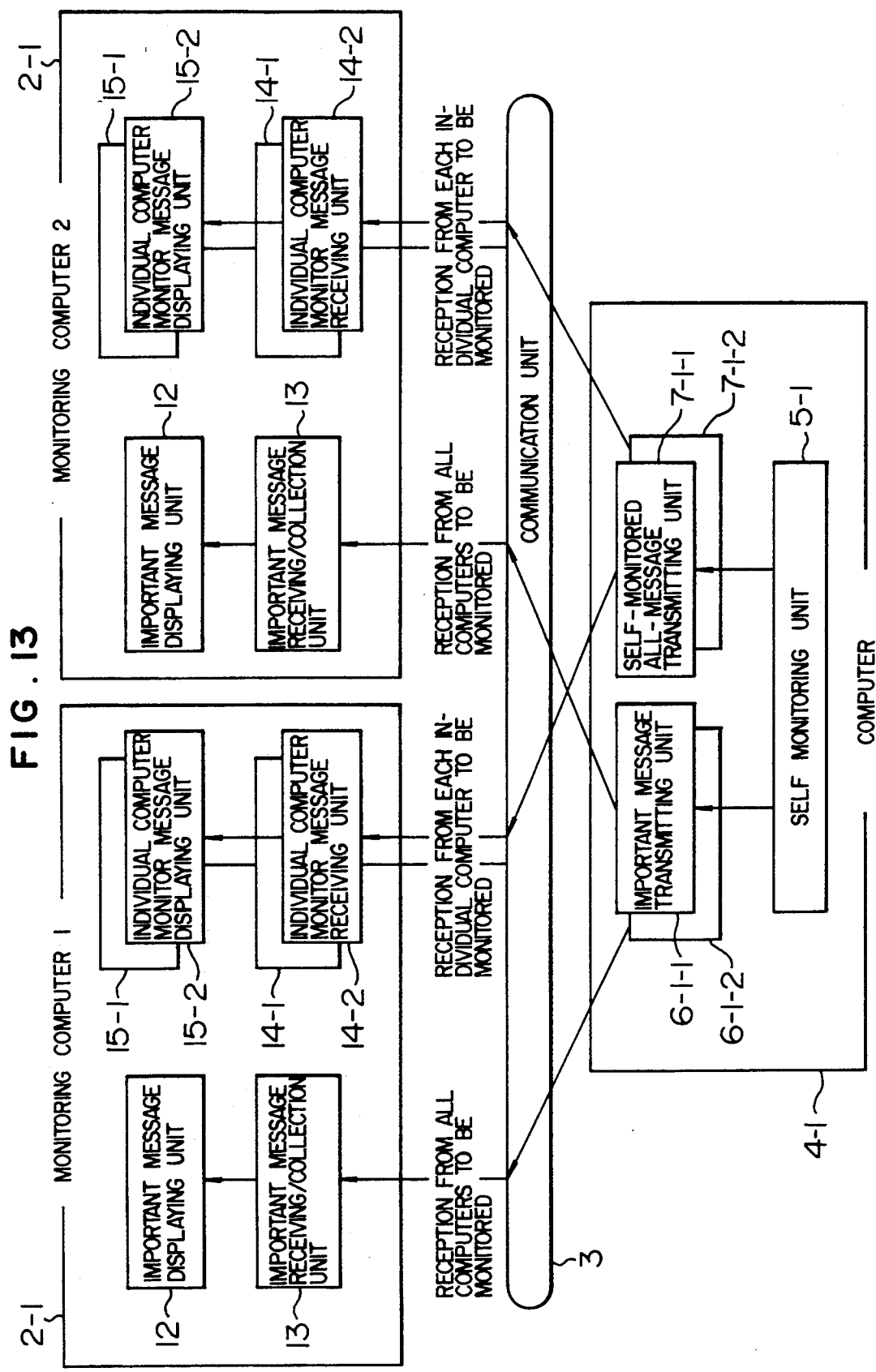
FIG. 13 is a block diagram explaining the outline of a method of monitoring a computer system with a plurality of monitoring computers according to another embodiment of the present invention.

Referring to FIG. 13, the features of monitoring computers will be described first. The important message transmitting units 6-1-1 and 6-1-2 and individual monitor message transmitting units 7-1-1 and 7-1-2 respectively of a computer 4-1 are provided in as many number as that of a plurality of monitoring computers 2-1. The important message transmitting units 6-1-1 and 6-1-2 have the same structure and operation except that a different address is used as the monitoring computer identifier when transmitting a packet. For the system using a plurality of monitoring computers, the following embodiments (1) to (4) may be reduced in practice. The structure of the monitoring computer of these embodiments has the fundamental structure same as that shown in FIG. 1. Two of such monitoring computers 2-1 are used in the system shown in FIG. 13.

(1) System with Parallel Monitoring Computers

The system is monitored at a plurality of different sites at the same time based upon monitor messages transmitted by a plurality of transmitting units. For example, the system is monitored by monitoring computers installed at the system management section and system development section at the same time, thereby quickly responding to an occurrence of an abnormal state.

(2) Divisional Monitoring of Monitor Area

Figure 14:
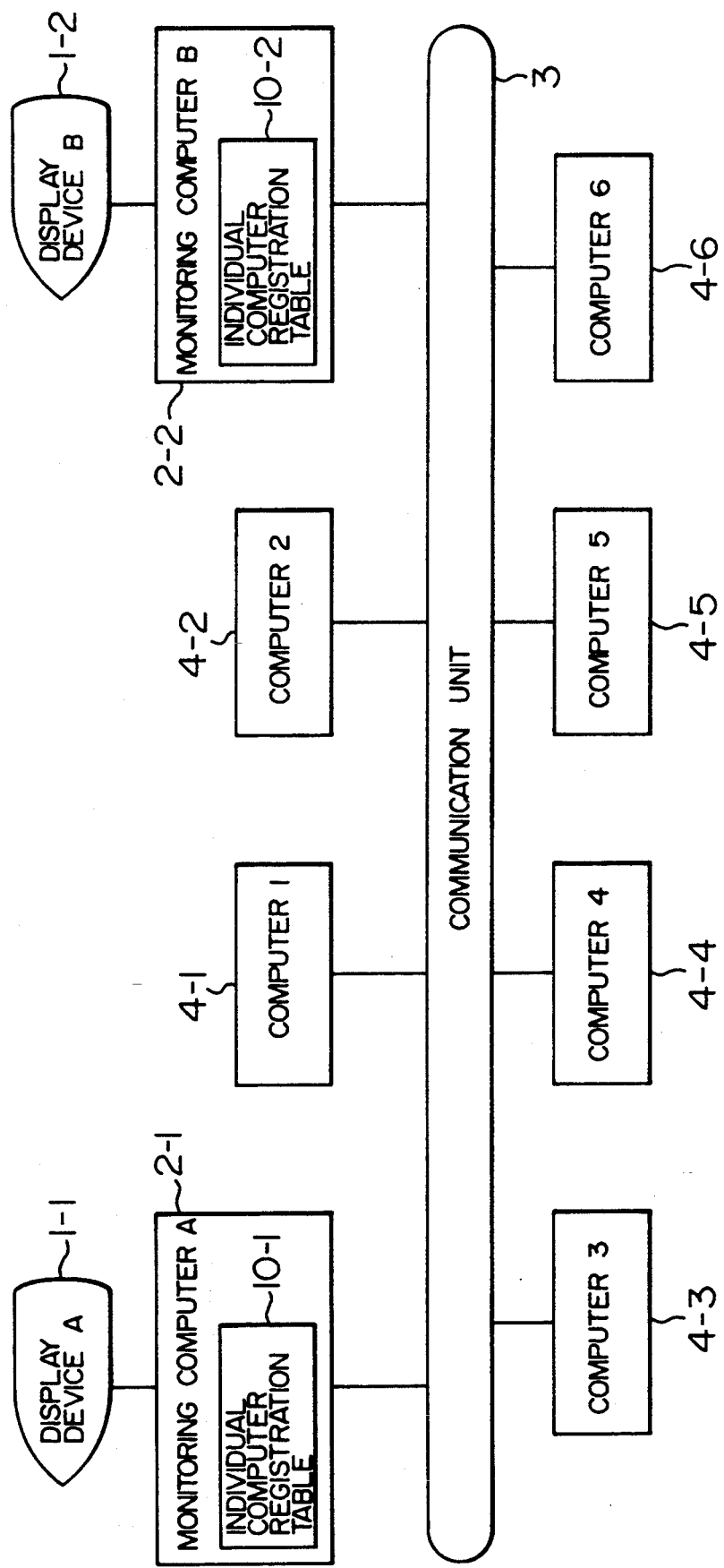
FIG. 14 is a block diagram showing the system configuration wherein the system is monitored divisionally by a plurality of monitoring computers.

FIG. 14 shows the system configuration wherein the system is divisionally monitored by a plurality of monitoring computers. The system includes monitoring computers 2-1 and 2-2, displays 1-1 and 1-2, computers to be monitored 4-1, 4-2, 4-3, 4-4, 4-5, and 4-6, and a communication unit 3. Individual computer registration tables 10-1 and 10-2 are additionally provided for the two monitoring computers 2-1 and 2-2. For example, the individual computer registration table 10-1 registers the computers 4-1, 4-2, and 4-3 as its monitor objects, and the individual computer registration table 10-2 registers the computers 4-4, 4-5, and 4-6 as its monitor objects, e.g., the names thereof. During the monitoring operation (refer to Section 2. Monitoring Start Sequence), the monitoring computer 2-1 responds to a broadcast packet transmitted from the computers 4-1, 4-2, and 4-3, but it will not respond to a broadcast packet transmitted from the computers 4-4, 4-5, and 4-6. Similarly, the monitoring computer 2-2 will not respond to a packet transmitted from the computers not registered in the individual computer registration table 10-2. The computer does not transmit a monitor message to the monitoring computer not responding to the packet. Accordingly, the computers 4-1, 4-2, and 4-3 transmit monitor messages only to the monitoring computer 2-1, and the computers 4-4, 4-5, and 4-6 transmit monitor messages only to the monitoring computer 2-2. In this way, the two monitoring computers can monitor the divisional monitor areas of the system.

As shown in FIG. 1, it is possible to update the individual computer registration table 10 on-line by using an individual computer registration table updating unit 9. When the table is updated on-line, the updating unit instructs the transmission start instructing unit to issue a start instruction, enabling an identification of the new table contents at once. In this embodiment, if the individual computer registration table has no data registered, the monitor area is not limited to a particular area, but all computers of the system are monitored.

(3) Mutual Monitoring between Monitoring Computers

Referring again to FIG. 1, mutual monitoring will be described. For the system having a plurality of monitoring computers, each monitoring computer 2 is provided with a self-monitoring unit 5-3, a self-monitored all-message transmitting unit 7-3, and a transmission start instructing unit 8-3. These three units have the same structure as those of the computer 4-1, and so the description thereof is omitted. By adding the three units to each of a plurality of monitoring computers of the system, it becomes possible to mutually monitor the monitoring computers. In other words, monitor messages for one monitoring computer can be monitored by another monitoring computer, thereby allowing a rapid response to an occurrence of an abnormal state of a monitoring computer. In this mutual monitoring, only the monitoring function used by each computer is added to the monitoring computer, and it is not necessary for each monitoring computer to know the address of another monitoring computer by which the computer is monitored. As a result, a change in the system configuration or the like can be made easily, as opposed to the mutual monitoring of a multi-processor system.

A backup function of the monitor area is conceivable as a means of dealing with an occurrence of an abnormal state. When an abnormal state occurs at one monitoring computer, it is necessary for another monitoring computer to backup the monitor area of the monitoring computer in the abnormal state. This backup or change in the monitor area may be manually performed by an operator, such as by updating the individual computer registration table, or by newly providing a process of automatically updating the table upon the occurrence of an abnormal state.

(4) Backup of Monitor Area

Referring to FIG. 14, a backup procedure will be described which is executed when an abnormal state occurs at one of a plurality of monitoring computers of the system.

In FIG. 14, the monitoring computer 2-1 monitors computers 4-1, 4-2, and 4-3, and the monitoring computer 2-2 monitors computers 4-4, 4-5, and 4-6. The monitoring computers 2-1 and 2-2 are mutually monitoring as discussed above in (3) Mutual Monitoring between Monitoring Computers. When an abnormal state occurs at the monitoring computer 2-1, the computers 4-1, 4-2, and 4-3 will not receive a reply for transmitted monitor messages and can therefore identify an abnormal state of the monitoring computer 2-1. The computer stops transmitting the monitor messages, and thereafter transmits again a broadcast packet and waits for a response to it. At this time, the monitoring computer 202 is informed of the abnormal state of the monitoring computer 2-1. Then, the monitoring computer 2-2 deletes the contents of the individual computer registration table 10-2. As described previously, the monitoring computer of this embodiment does not limit the monitor area when no data is registered in its table. Accordingly, when the monitoring computer 2-2 receives a broadcast packet from the computers 4-1, 4-2, and 4-3, it responds to the packet. Upon reception of a reply to this packet, the computers 4-1, 4-2, and 4-3 designate the monitoring computer 2-2 as the new monitoring computer and starts transmitting monitor messages. In the above manner, the backup function of the monitor area is completed.

7. Computer with Monitoring Function

In the above embodiments, the monitoring computer and computer to be monitored each having a different function have been used. In the following embodiment, a computer added with a monitoring function which can be turned on and off is used. This embodiment will be described with reference to FIG. 15.

Figure 15:
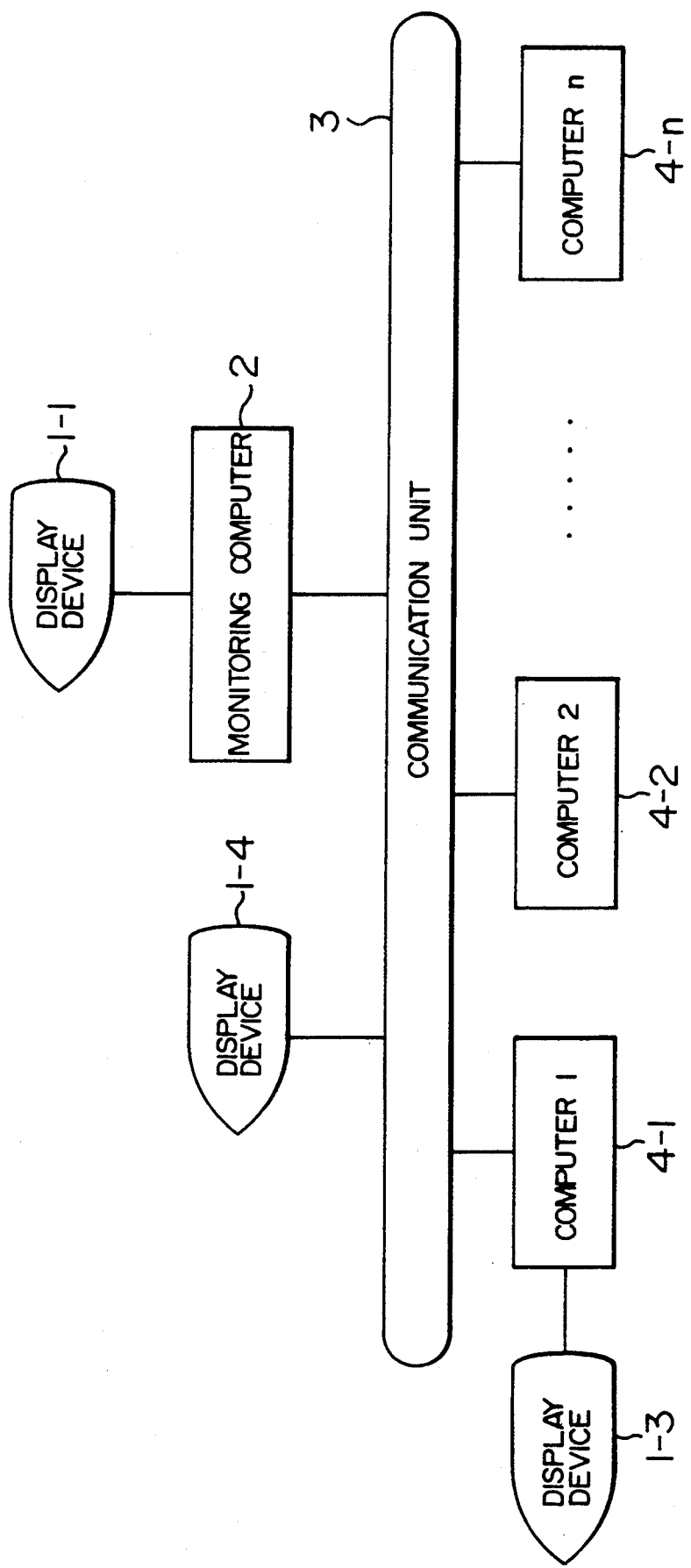
FIG. 15 is a block diagram showing the system configuration having a monitoring backup function provided by a computer with a monitoring function.

The system shown in FIG. 15 has a monitoring computer 2, a display device 1-1, n computers 4-1 to 4-n, a display device 1-3 connected to the computer 4-1, and a communication unit 3. The monitoring computer 2 and computers 4-2 to 4-n have the same structure and operation as those described in Section 6. Monitoring Method Using A Plurality of Monitoring Computers), and so the description thereof is omitted. The computer 4-1 has the processor function as well as the monitoring function.

Figure 16:
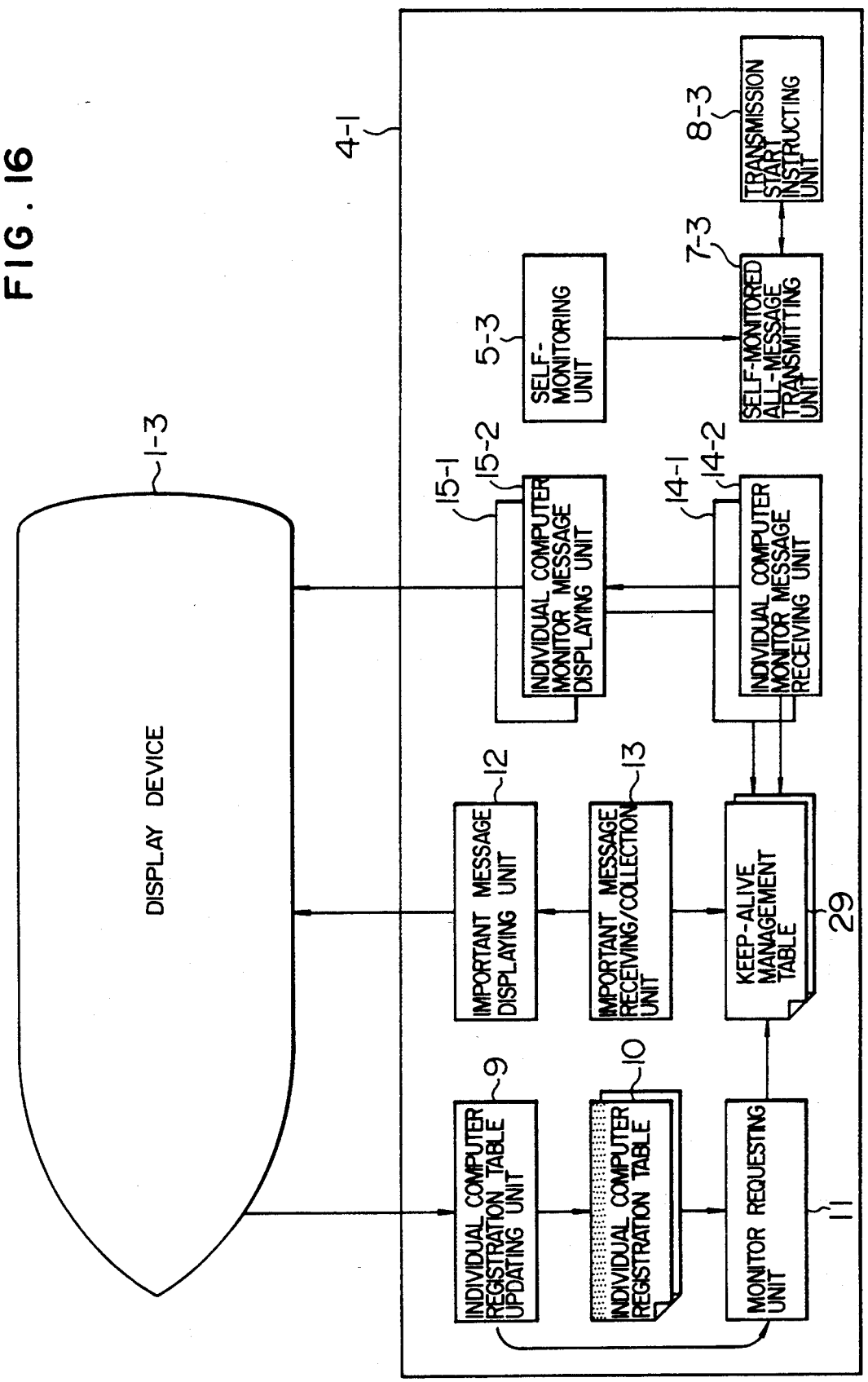
FIG. 16 is a block diagram showing an example of a computer with a monitoring function.

FIG. 16 shows the details of the computer 4-1. This computer has a processor function like other computers, and in addition to this function, it is provided with an important message transmitting unit 13, an important message displaying unit 12, an individual computer monitor message receiving unit 14, an individual computer monitor message displaying unit 15, an individual computer registration table updating unit 9, an individual computer registration table 10, a monitor requesting unit 11, and a monitoring computer keep-alive management table 29. The table 29 stores a monitoring function on/off flag. When the monitoring function is turned on, the computer 4-1 functions as a monitoring computer allowing monitor messages to be displayed on the display device 1-3. When the monitoring function is turned off, it becomes a computer like other computers 4-2 to 4-n. This computer 4-1 can be used as a temporary monitoring computer when the monitoring computer 2 is in an abnormal state, by turning on the monitoring function on/off flag in the monitoring computer keep-alive management table 29.

The display device 1-4 shown in FIG. 15 may be used to display monitor messages collected by the monitoring computer 2 and transmitted via the communication unit, or monitor messages transmitted from the computer 4-1 with the monitoring function.

Figure 17:
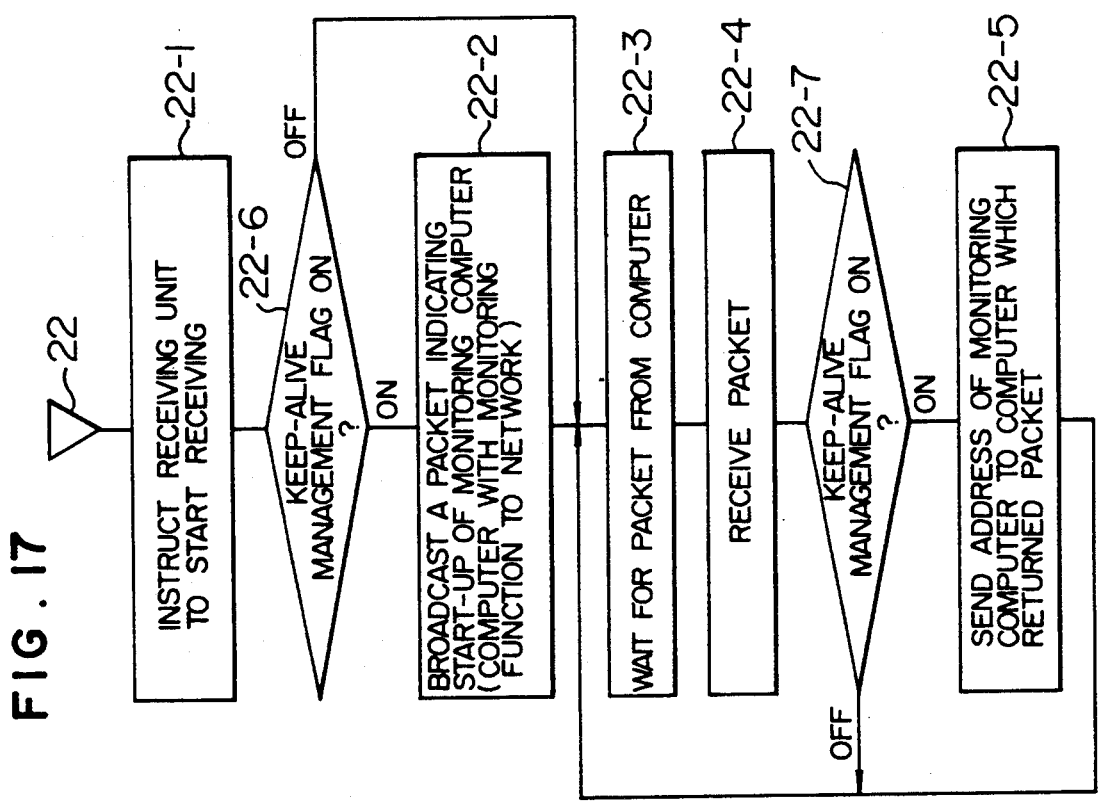
FIG. 17 is a flow chart explaining an example of the start-up operation of a computer with a monitoring function.

Referring to FIG. 17, the start-up procedure of the monitoring computer with a monitoring function will be described. This start-up procedure 22 is executed by the monitor requesting unit 11. Similar to the monitoring function described with FIG. 4, the monitor requesting unit 11 first requests each receiving unit to start receiving (Step 22-1). This reception process is executed irrespective of the on/off state of the monitoring function in order to rapidly start monitoring when the monitoring function changes from its off-state to onstate. Next, at Step 22-6, if the keep-alive management flag in the table 29 is on, a packet is broadcast at Step 22-2. If off, a packet is not broadcast. Thereafter, the monitor requesting unit 11 waits for a packet from a computer (Step 22-3). Upon the reception of the packet (Step 22-4), the keep-alive management flag is referred to (Step 22-7). If the flag is on, the address of the computer 4-1 is transmitted back to the computer from which the packet was returned (Step 22-5). If off, the address of the computer 4-1 is not transmitted.

As described above, the process while the flag is on is the same as a general monitoring computer as described with FIG. 4, and for the process while the flag is off, the monitoring function is not requested for this computer.

Figure 18:
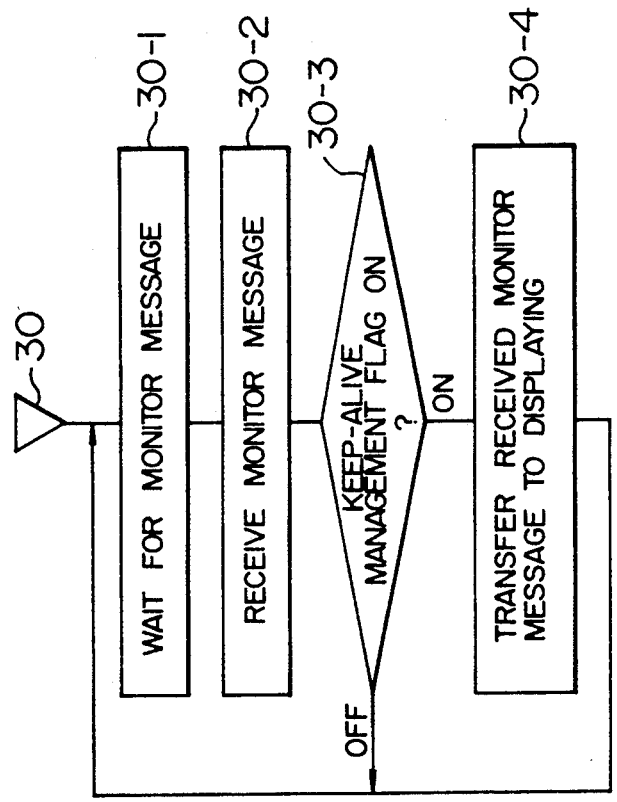
FIG. 18 is a flow chart explaining an example of the reception operation of an important message receiving-/collecting unit or an individual computer monitor message receiving unit.

FIG. 18 illustrates the procedure of the important message receiving/collecting unit 13 and individual computer monitor message receiving units 14-1 and 14-2 which started the message reception at the Step 22-1 shown in FIG. 17. The reception procedure is the same for all the units 13, 14-1, and 14-2. Each unit waits for monitor messages (Step 30-1), and receives monitor messages (Step 30-2). Upon the reception of the monitor messages, the keep-alive management flag is referred to (Step 30-3). If the flag is on, the received monitor messages are transferred to the displaying unit (Step 30-4), and if the flag is off, the received monitor messages are not transferred to the displaying unit but they are discarded.

8. Replacement and Addition of Monitoring Computer

Another embodiment will be described wherein a monitoring computer capable of being on-line mounted on and on-line dismounted from a network is used as the monitoring computer described in Sections 1 (Summary of Monitoring Method) to 7. (Computer with Monitoring Function). An ability to be on-line mounted and dismounted relative to the network means to satisfy the following two conditions:

(a) the on-line service is not affected when the monitoring computer is physically connected to the network, and
(b) communication control devices and network system can be configured on-line.

As described in Section 2. Monitoring Start Sequence, the monitoring of this embodiment can be started irrespective of the start-up order of the monitoring computer and computers to be monitored. In this context, if a monitoring computer having an ability to be on-line mounted and dismounted, such as a work station, is used, it means that the monitoring function can be changed on-line.

If a defective monitoring computer or work station is to be replaced, this work station is disconnected from the network, and a new work station with a built-in monitoring function (e.g., with installed software) is connected to the network. Thereafter, as described in Section 2. Monitoring Start Sequence, monitoring the computers on the network starts in response to the system power-on. Addition of such a monitoring computer can be made in the similar manner.

The above-described various units may be realized by using either programs, or hardware. Monitor messages are visually displayed on the display in the above embodiments. Instead, they may be informed by using other means such as voices and vibrations depending upon the weight level of monitor messages.

According to the aspects of the present invention, the following advantages can be obtained.

(1) Receiving units or display windows for monitor messages are provided for each individual computer. It is therefore possible to eliminate a message reception delay and to display monitor message in real time.

(2) The computers of the system can be efficiently monitored by displaying monitor messages on different windows depending upon the weight level of monitor messages.

(3) Monitoring can be started irrespective of the start-up order of the monitoring computer and computers to be monitored.

(4) Monitoring can be started without storing addresses of the monitoring computer and computers to be monitored, reducing the labor required for the address registration and making it easy to change the system configuration.

(5) The system can be monitored at different sites at the same time by installing a plurality of monitoring computers.

(6) The monitor area may be divided and changed easily by installing a plurality of monitoring computers.

(7) With the mutual monitoring between monitoring computers, an abnormal state of a monitoring computer can be dealt with quickly, particularly, the monitor area backup function is easily realized.

(8) With a monitoring function keep-alive management table provided to a computer having the monitoring function, the monitoring function can be turned on and off when necessary. Accordingly, the computer can be used either as the monitoring computer or the computer to be monitored, improving the use efficiency of the computer.

What is claimed is:

1. A computer system comprising:
a plurality of monitored computers each comprising:
self-monitoring means for monitoring a status of the monitored computer to generate a monitor message indicating the monitored status, and a plurality of monitor message transmitters, each of said plurality of monitor message transmitters receiving the monitor message from said self-monitoring means and transmitting said monitor message; and a plurality of monitoring computers each comprising:

a plurality of monitor message receiving means respectively corresponding to said plurality of monitored computers for receiving said monitor messages respectively transmitted from some of said plurality of monitored computers in parallel independently of each other, self-monitoring means for monitoring a status of the monitoring computer to generate a monitoring computer monitor message, monitoring computer monitor message transmitting means for receiving the monitoring computer monitor message from said self-monitoring means and transmitting said received monitor message to other ones of said plurality of monitoring computers, a plurality of monitoring computer monitor message receiving means respectively corresponding to said other ones of said plurality of monitoring computers, for each receiving the monitoring computer monitor message from said monitoring computer monitor message transmitting means of a corresponding one of said plurality of monitoring computers; and monitoring means for monitoring said other ones of said plurality of monitoring computers in addition to said plurality of monitored computers in parallel based on the received monitor messages and the received monitoring computer messages.

2. A computer system according to claim 1, further comprising at least one display unit, wherein said monitoring computer further comprises displaying means for displaying said monitor message received by each of said plurality of monitor message receiving means in parallel on areas of said at least one display unit which are respectively provided for said plurality of monitor message receiving means.

3. A computer system according to claim 1, wherein at least one of said plurality of monitoring computers includes means for issuing a monitor request, and each of said plurality of monitored computers includes transmission start instructing means for instructing said plurality of monitor message transmitters to start transmission of the received monitor message in response to said monitor request.

4. A computer system according to claim 1, wherein said plurality of said monitor message transmitters of each of said plurality of monitored computers transmit the monitor message to each of said plurality of monitoring computers.

5. A computer system according to claim 4, wherein said plurality of monitored computers are simultaneously monitored by said plurality of said monitoring computers.

6. A computer system according to claim 1, further comprising at least one display unit, wherein each said monitoring computer comprises displaying means for displaying said monitor message received by each of said plurality of monitor message receiving means and said monitoring computer monitor messages received by said plurality of monitoring computer monitor message receiving means on windows of said at least one display unit, respectively.

7. A computer system according to claim 6, wherein each of said plurality of monitoring computers includes a registration table for storing the information for designating said monitored some of said monitored computers to be monitored by each of said plurality of monitoring computers and each of said monitoring computers receives the monitor messages based on the registration table.

8. A computer system according to claim 7, wherein one of said plurality of monitoring computers includes means for updating said registration table to perform the monitoring operation of another of said monitoring computers when an abnormal state of another of said monitoring computers is detected through mutual monitoring.

9. A computer according to claim 8, wherein each of said plurality of monitoring computers includes a monitoring function keep-alive management table for storing management information for turning on and off the operations of each of said plurality of monitor message receiving means and the windows of said display unit.

10. A computer system according to claim 1, further comprising communication means interconnecting said plurality of computers to be monitored and said monitoring computers for transferring data therebetween.

11. A computer system according to claim 1, further comprising:

a plurality of display units each including a screen; and means for concurrently displaying on the screens of at least two of said plurality of display units at least one of said monitor message and said monitoring computer monitor message.

12. A computer system comprising:

a plurality of monitored computers, each of which executes a user program under control of an operating system, each of said plurality of monitored computers comprising:

self-monitoring means for monitoring a status of the monitored computer to generate monitor messages output from the operating system and the user program, wherein said monitor messages are output based on at least one of an execution result of the user program and a hardware failure message, classifying means for classifying into two types of monitor messages the monitor messages output from the operating system and the monitor messages output from the user program, first transmitting means for transmitting the monitor messages output from the operating system, and second transmitting means for transmitting the monitor messages output from the user program; and at least one monitoring computer comprising:

a plurality of first receiving means, each of said first receiving means corresponding to one of the first transmitting means of a corresponding one of the monitored computers, each of said first receiving means receiving the monitor messages transmitted from the corresponding first transmitting means, a plurality of second receiving means each corresponding to some of said second transmitting means corresponding to some of said plurality of monitored computers, each of said plurality of second receiving means receiving the monitored messages transmitted from said second transmitting means of each of said some of said monitored computers, and display means for displaying the monitor messages received by said first and second receiving means on at least one display unit in parallel.

13. A computer system according to claim 12, further comprising at least one display unit, wherein said monitoring computer further comprises displaying means for displaying said classified types of monitor messages received by said plurality of first and second receiving means in parallel on areas of said at least one display unit which are respectively provided for said plurality of first and second receiving means.

14. A computer system according to claim 12, wherein said display means includes:
   (a) means for generating a window for displaying the monitor message output from the operating system and the user program of each of said plurality of monitored computers;
   (b) means for generating a window for accessing each of said plurality of monitored computers to enter an input thereto and display an output therefrom;
   (c) means for generating a window for displaying the monitor message output from the operating system of each of said plurality of monitored computers; and
   (d) means for generating an operation menu for said generated windows.

15. A computer system according to claim 14, wherein said display means further comprises a plurality of display units each including a screen and
   wherein said computer system further comprises means for concurrently displaying on the screens of at least two of said plurality of display units at least one of said displayed output monitor message and said displayed output from each of the plurality of monitored computers.

16. A computer system according to claim 12, further comprising communication means interconnecting said plurality of computers to be monitored and said monitoring computers for transferring data therebetween.

* * * * *

UNITED STATES PATENT AND TRADEMARK OFFICE
CERTIFICATE OF CORRECTION

PATENT NO. : 5,432,715

DATED : Jul. 11, 1995

INVENTOR(S) : Mari Shigematsu, et al

It is certified that error appears in the above-identified patent and that said Letters Patent is hereby corrected as shown below:

| Column | Line | |
|---|---|---|
| 2 | 7 | Change "first" to --further--. |
| 3 | 25 | Change "a" to --an--. |
| 5 | 3 | Change "simplicitly" to --simplicity--. |
| 8 | 49 | Change "pocket" to --packet--. |
| 12 | 45 | Delete "with". |
| 15 | 30 | Change "onstate" to --on-state--. |

Signed and Sealed this

Twenty-third Day of January, 1996

Attest:

BRUCE LEHMAN

*Attesting Officer*  *Commissioner of Patents and Trademarks*